W. H. HUNT.
DUMPING TRUCK OR VEHICLE.
APPLICATION FILED APR. 22, 1909.
955,875.
Patented Apr. 26, 1910.
6 SHEETS—SHEET 1.
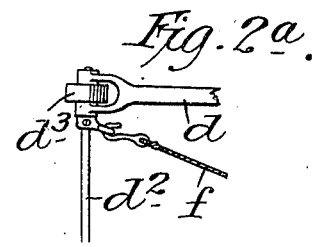
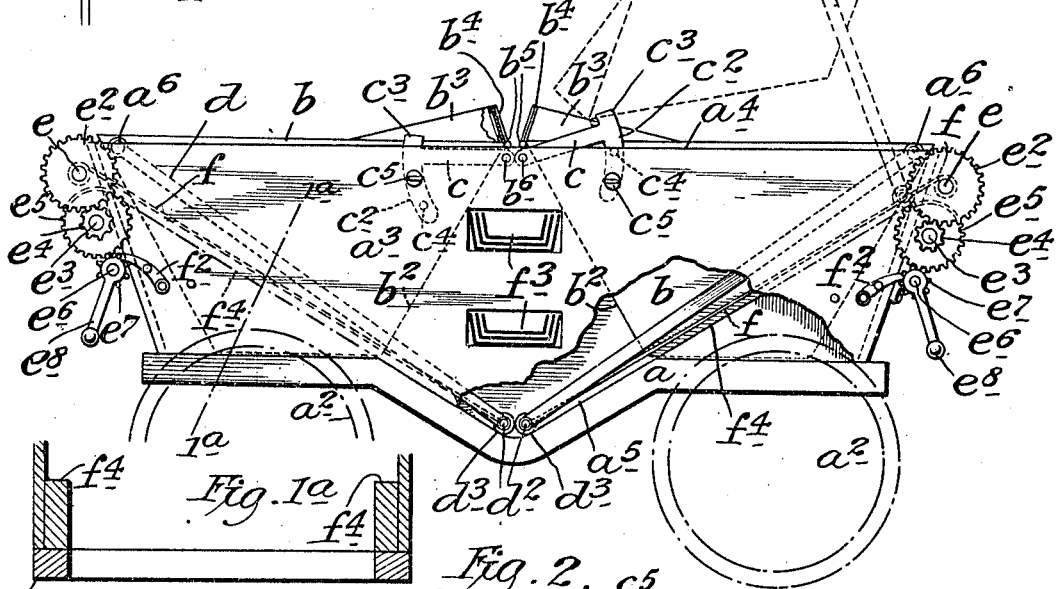
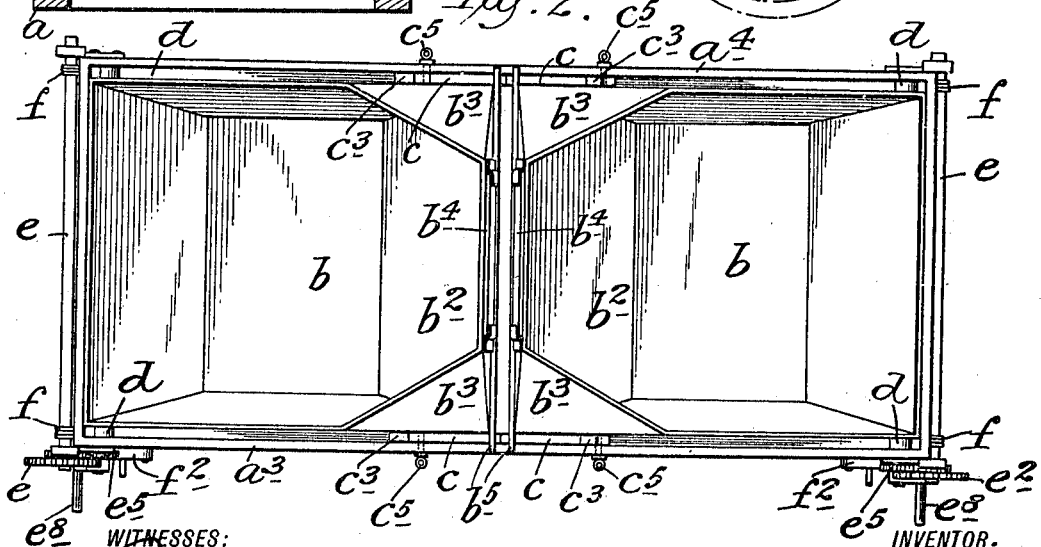
WITNESSES:
INVENTOR.
William H. Hunt,
BY Edgar Tate & Co.
ATTORNEYS.

W. H. HUNT.
DUMPING TRUCK OR VEHICLE.
APPLICATION FILED APR. 22, 1909.
955,875.
Patented Apr. 26, 1910.
6 SHEETS—SHEET 2.
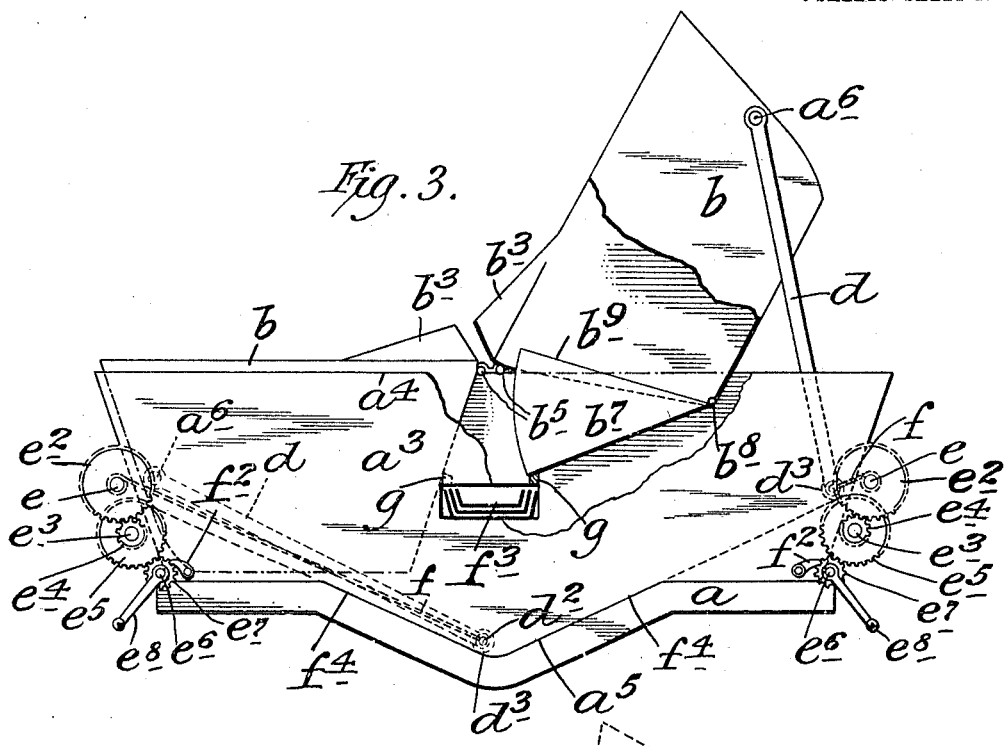
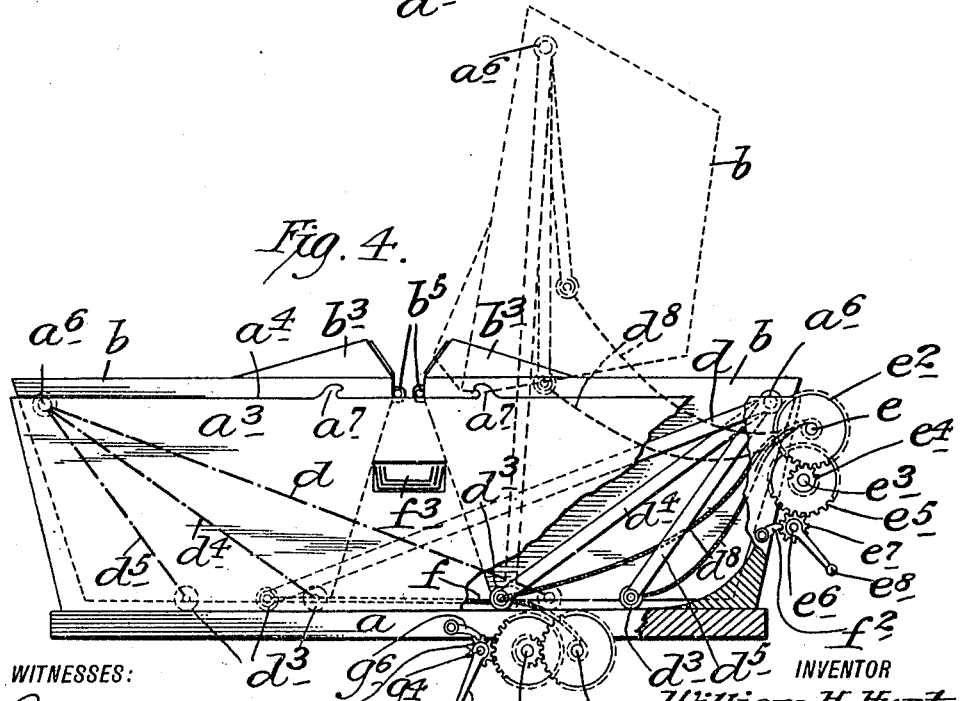

W. H. HUNT.
DUMPING TRUCK OR VEHICLE.
APPLICATION FILED APR. 22, 1909.
955,875.
Patented Apr. 26, 1910.
6 SHEETS—SHEET 3.
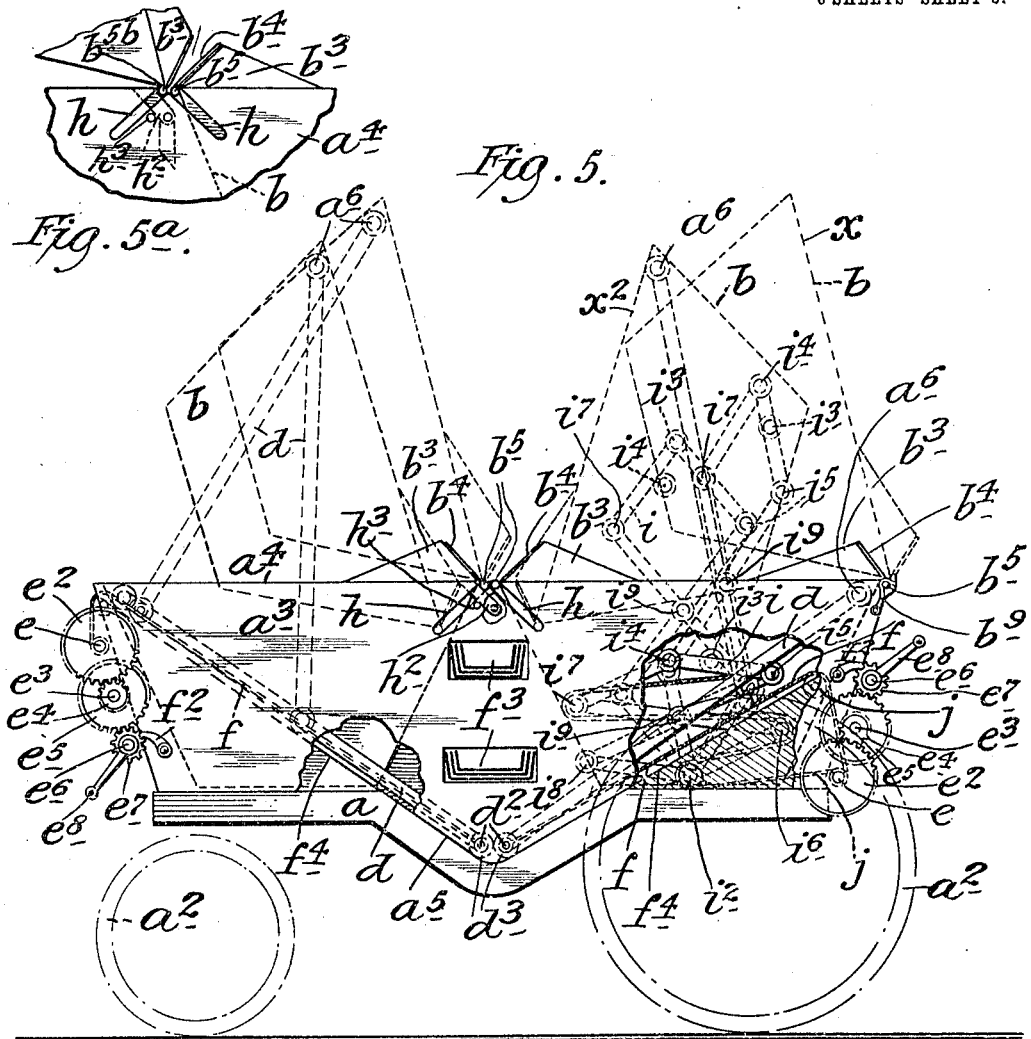
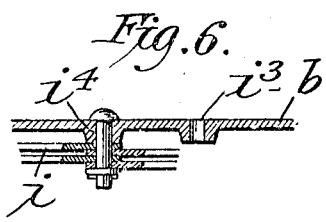
WITNESSES:
INVENTOR
William H. Hunt,
BY
ATTORNEYS.

W. H. HUNT.
DUMPING TRUCK OR VEHICLE.
APPLICATION FILED APR. 22, 1909.
955,875.
Patented Apr. 26, 1910.
6 SHEETS—SHEET 4.
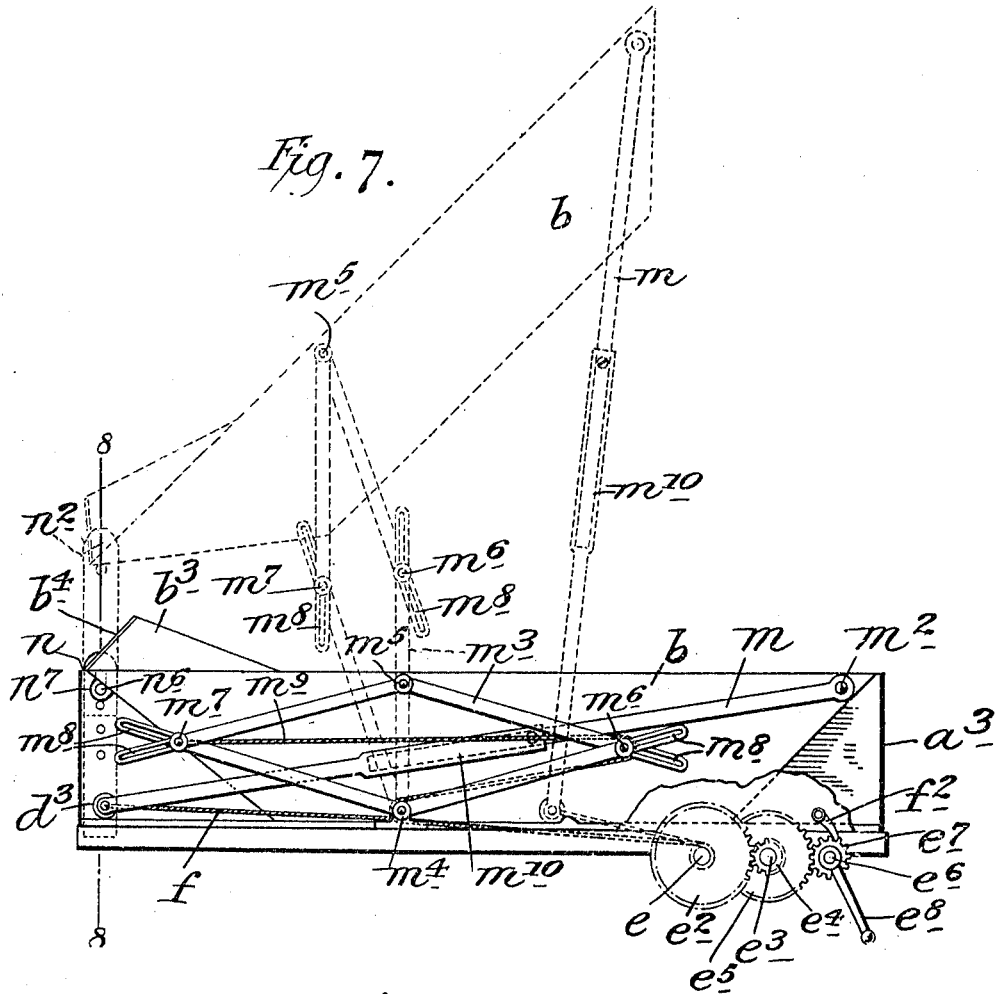
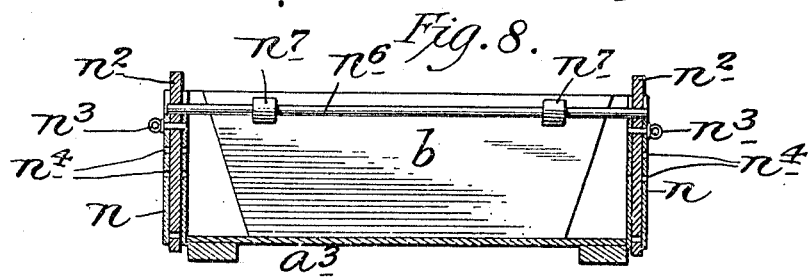
WITNESSES:
INVENTOR,
William H. Hunt,
BY Edgar Tate & Co.
ATTORNEYS.

W. H. HUNT.
DUMPING TRUCK OR VEHICLE.
APPLICATION FILED APR. 22, 1909.
955,875.
Patented Apr. 26, 1910.
6 SHEETS—SHEET 5.
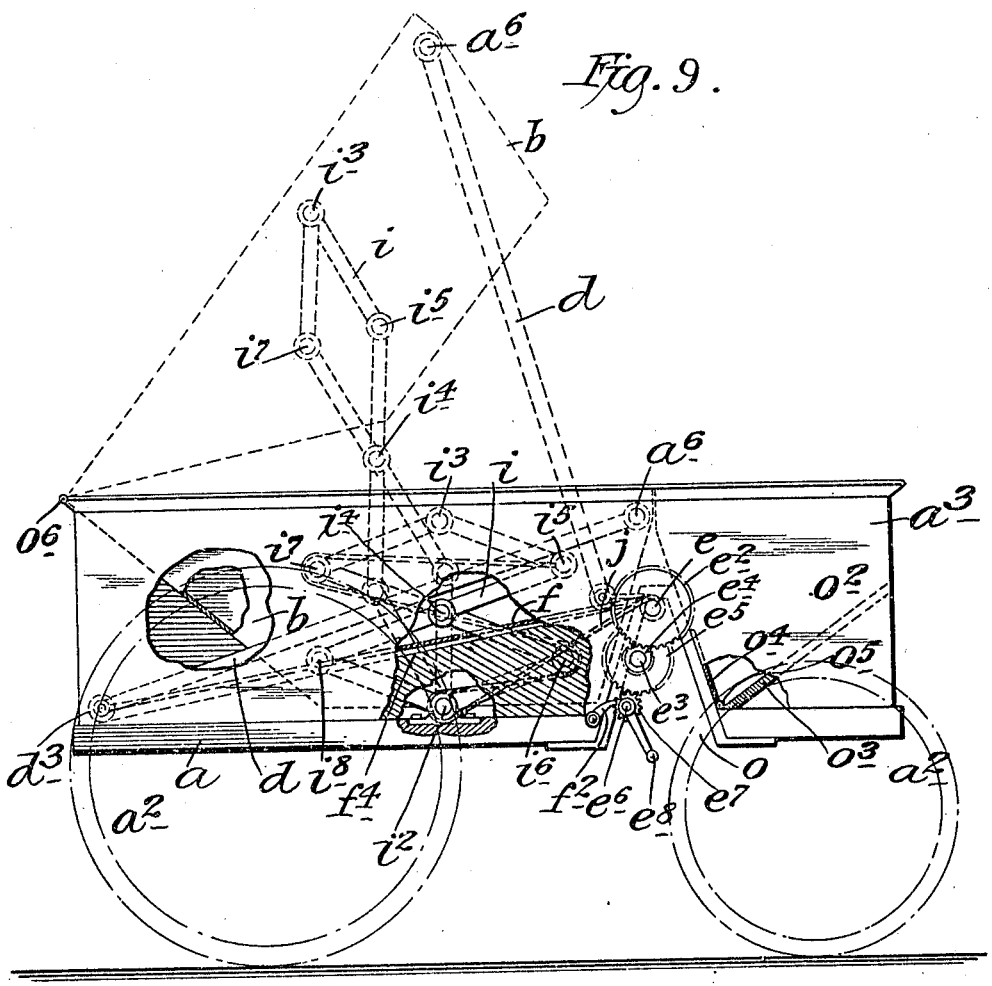
WITNESSES:
INVENTOR,
William H. Hunt,
BY Edgar Tate & Co.
ATTORNEYS

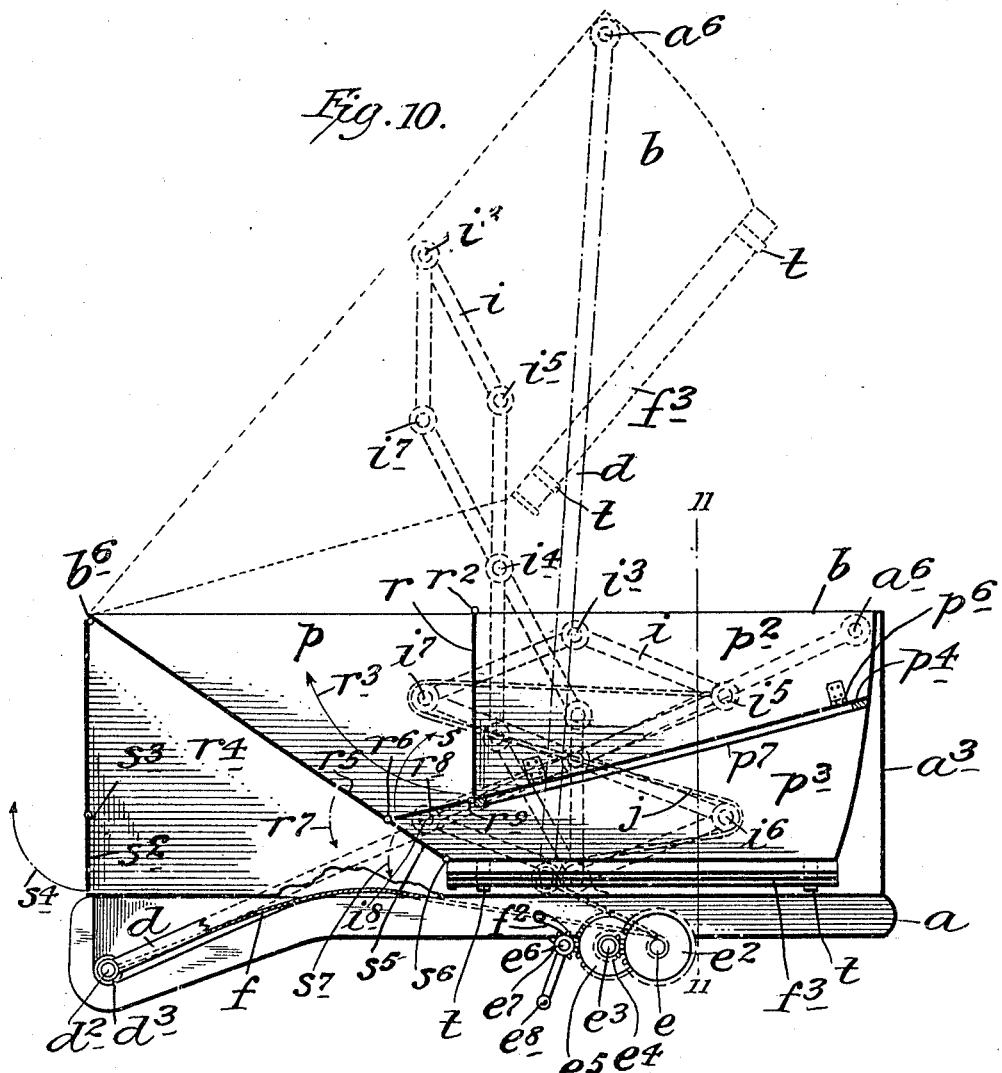
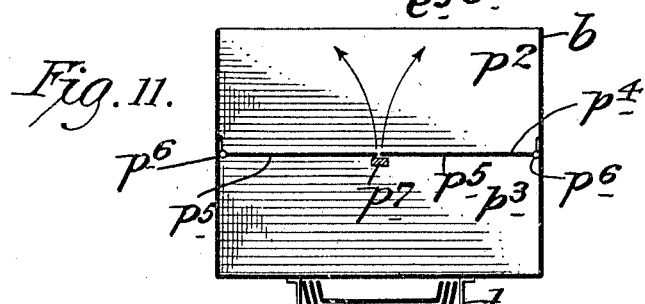

UNITED STATES PATENT OFFICE.

WILLIAM H. HUNT, OF NEW YORK, N. Y.

DUMPING TRUCK OR VEHICLE.

955,875.  Specification of Letters Patent.  Patented Apr. 26, 1910.

Application filed April 22, 1909. Serial No. 491,521.

*To all whom it may concern:*

Be it known that I, WILLIAM H. HUNT, a citizen of the United States, and residing at New York, in the county of New York and State of New York, have invented certain new and useful Improvements in Dumping Trucks or Vehicles, of which the following is a specification, such as will enable those skilled in the art to which it appertains to make and use the same.

This invention relates to what are known as dumping trucks or vehicles; and the object thereof is to provide an improved device of this class designed for use in transporting coal, sand, earth or any similar substances; a further object being to provide a truck or vehicle of the class specified so constructed as to provide for a high or comparatively high discharge of material to be transported and dumped; a still further object being to provide a truck or vehicle of the class specified, the load of which may be divided into separate parts and separately dumped; and with these and other objects in view the invention consists in a device of the class specified, constructed and operated as hereinafter described and claimed.

The invention is fully disclosed in the following specification, of which the accompanying drawings form a part, in which the separate parts of my improvement are designated by suitable reference characters in each of the views, and in which:—

Figure 1 is a side view of a truck or vehicle of the class specified constructed according to my invention, only the truck frame and wheels of the running gear being shown with my improvement mounted thereon and part of the construction broken away, Fig. 1$^a$ a partial section on the line 1$^a$—1$^a$ of Fig. 1, Fig. 2 a plan view of the device or apparatus shown in Fig. 1, Fig. 2$^a$ a plan view of a detail of the construction shown in Figs. 1 and 2, Fig. 3 a view similar to Fig. 1, but showing a modification with the wheels omitted, Fig. 4 a view similar to Fig. 3 and showing another modification, Fig. 5 a view similar to Fig. 1, but showing another modification, Fig. 5$^a$ a view of a detail of the construction shown in Fig. 5, Fig. 6 a sectional view of another detail of the construction shown in Fig. 5, Fig. 7 a view similar to Fig. 1, but showing another modification, and showing the bed on the truck frame in section, Fig. 8 a transverse vertical section on the line 8—8 of Fig. 7, Fig. 9 a view similar to Fig. 1, but showing another modification, Fig. 10 a longitudinal vertical section showing another modification, and;—Fig. 11 a partial transverse vertical section on the line 11—11 of Fig. 10.

In the practice of my invention as shown in Figs. 1 and 2, I provide a truck frame or bed $a$ only the wheels $a^2$ of the running gear being shown in the drawings, and mounted on the truck frame $a$ is a body $a^3$ in the opposite end portions of which are placed pans $b$.

The end portions of the body $a^3$ are preferably inclined inwardly and downwardly, and all the walls of said pans are preferably slightly inclined inwardly and downwardly, the inner end walls thereof being necessarily inclined as shown at $b^2$, and the side walls of the pans $b$ at the adjacent ends thereof are provided with inwardly directed wings $b^3$ which are triangular in shape, and form in connection with the adjacent end walls $b^2$ of said pans chutes for the discharge of the coal or other material, and placed between the wings $b^3$ of each pan, in the form of construction shown, are movable doors $b^4$ by which said chutes may be closed.

At the bottoms of the doors $b^4$, the pans $b$ are provided with transverse rods $b^5$ which rest on the sides $a^4$ of the body $a$, and pivoted at $b^6$ to the opposite sides of the body $a^3$ and between said sides and the pans $b$, and directly beneath the rods $b^5$ when the pans $b$ are in their normal position, are arms $c$ having segmental heads $c^2$. The heads are provided with upwardly directed extensions $c^3$ which project above said arms and the lower end portions thereof are provided with holes or apertures $c^4$, and said arms with the heads thereof may be locked in different positions by pins, bolts or other devices $c^5$ passed through the side walls $a^4$ of the body $a$, and in the operation of the apparatus or device as hereinafter described, the rods $b^5$ operate in connection with the arms $c$.

The bed or frame-work $a$ of the truck is provided centrally of its opposite sides with V-shaped recesses $a^5$, and pivoted to the opposite sides of the pans $b$ at the outer end corners thereof and the top thereof as shown at $a^6$ are levers $d$ which range downwardly and inwardly between the sides of the pans $b$, and the sides of the body $a^3$, and the inner ends of the levers $d$ of each pan are connected by cross rods $d^2$ as shown in Fig. 2ª and provided with rollers $d^3$.

At the opposite ends of the bed $a^3$ and near the top thereof are mounted transverse shafts $e$ provided with gear wheels $e^2$ below which are other transverse shafts $e^3$ provided with pinions $e^4$ which mesh with the gear wheels $e^2$, and the shafts $e$ are also provided with gear wheels $e^5$, and mounted below the shafts $e^3$ are crank shafts $e^6$ provided with pinions $e^7$ which mesh with the wheels $e^5$, and the shafts $e^6$ are provided with cranks $e^8$.

Connected with the shaft $e$ are cables $f$ which are connected with the inner lower end portions of the levers $d$, or with the transverse rods $d^2$ adjacent to said levers as clearly shown in Fig. 2ª, and the operation of this form of construction will be readily understood from the foregoing description when taken in connection with the accompanying drawings and the following statement thereof.

Pivoted to the side or sides of the body $a^3$ are pawls $f^2$ which operate in connection with the pinions $e^7$ to prevent the backward movement of the crank shafts $e^6$, and in the central part of the body $a^3$ and transversely thereof and between the pans $b$ are placed telescopic or other discharge chutes $f^3$.

In practice, whenever it is desired to discharge the contents of one or both of the pans $b$, the truck is placed in the desired position and either of the discharge chutes $f^3$ may be employed according to the height of the vehicle or truck as compared with the point at which the coal or other material is to be dumped.

It will be understood that the pans $b$ are preferably dumped successively, or one at a time, and in this operation one of the crank shafts $e^6$ is turned and the corresponding pan is raised into the position shown in dotted lines in Fig. 1 by means of the levers $d$. In this operation, the rollers $d^2$ at the ends of the levers $d$ connected with said pan move upwardly and outwardly over inclined tracks $f^4$ which extend from the bottom of the recesses $a^5$ upwardly and outwardly in the direction of the corresponding shaft $e$, and the rod $b^5$ of said pan moves outwardly into the position shown in Fig. 1 and strikes against the upwardly directed parts $c^3$ of the heads $c^2$ of the corresponding arms $c$. The head $b^4$ of the pan is then opened and the contents thereof will be discharged into the chute formed by the parts $b^2$ and $b^3$ as will be readily understood. In this operation, if it is desired to have a high discharge, the arms $c$ are raised as shown at the right in Fig. 1 and held in the raised position, but if this is not desired the arms $c$ may be left in their normal position as shown at the left in Fig. 1.

If the arms $c$ are left in their normal position the bottom chute $f^3$ may be employed, and if said arms are raised the top chute $f^3$ may be employed, or if desired one chute may be made to serve in both cases. The distinctive feature of this form of construction is in the separate pans employed in the body $a^3$ whereby a part of a load or a whole load may be dumped at any desired point if desired, and in the means employed for dumping said pans separately or one at a time.

In the construction shown in Fig. 3, the body $a^3$ is employed as are also the pans $b$. In this form of construction the inner end walls of the pans $b$ are formed into doors $b^7$ which are pivoted to the bottoms of the pans at $b^8$ and are provided with side wings $b^9$, and at the tops of the transverse chute opening at $f^3$ are placed transverse bars $g$ on which the doors $b^7$ rest and slide in the operation of dumping the pans $b$ as hereinafter described. In this form of construction the levers $d$ are also employed, but said levers are pivoted to the pans $b$ at lower points than in Fig. 1, and the cables $f$ are connected with said levers and with the shafts $e$ as in Fig. 1 and the same winding means or means for operating the shaft $e$ is employed consisting of the shafts $e^3$ and $e^6$, and the gears connected therewith together with the cranks $e^8$ on the shafts $e^6$.

When the pans $b$ are in their normal positions, the doors $b^7$ are closed and are held in their closed position by the transverse bars $g$, and when one of said pans is raised into the dumping position as shown at the right of Fig. 3, the door $b^7$ thereof resting on the corresponding transverse part $g$ is automatically opened as said pan is raised and the contents of said pan will be discharged into the chute $f^3$ as will be readily understood.

In the construction shown in Fig. 4, the body $a^3$ is employed together with the truck frame $a$ and the winding mechanism consisting of the shafts $e$, $e^3$ and $e^6$ with the gears connected therewith. In this form of construction two pans $b$ are also employed, and the said pans are provided with transverse rods $b^5$ which are secured thereto and which are adapted to ride on the side walls $a^4$ of the body $a^3$, and said side walls are provided at the opposite sides of the central portion thereof with inwardly directed hooks $a^7$ which serve as stops for said rods in the operation of dumping the pans as hereinafter described. In this form of construction each pan is provided at its opposite sides with two levers $d^4$ and $d^5$ which are pivoted to the opposite sides thereof at $a^6$ and between the said pans and the side walls $a^4$ of the body $a^3$, and the levers $d^4$ are longer than the levers $d^5$, and other levers $d$ are also pivoted to the opposite sides of the pans at $a^6$ and are much longer than the levers $d^4$, and all of said levers are provided with the rollers $d^3$ as in Figs. 1 and 3, and these rollers travel on tracks or ways on the sides of the truck frame or bed $a$.

Connected with the inner lower ends of the levers $d^4$ and $d^5$ are cables $d^8$ which are connected with the shaft $e$, and connected with the inner ends of the levers $d$ are other cables $f$ which are connected with a shaft $g^2$ mounted beneath the truck frame or bed $a$ and geared in connection with another shaft $g^3$ which is geared in connection with a crank shaft $g^4$, all of said shafts being arranged transversely of the truck frame or bed $a$. The crank shaft $g^4$ is provided with a crank $g^5$ and a pawl $g^6$ is pivoted to the truck frame or bed $a$ and operates in connection with a pinion $g^7$ on the shaft $g^4$, and the shafts $g^2$, $g^3$ and $g^4$ are geared in connection in the same manner as the shafts $e$, $e^3$ and $e^6$.

In Fig. 4 only one of the pans $b$ is shown provided with its dumping mechanism, but it will be understood that, in practice, both of said pans are similarly provided, the winding gears of each pan, the levers $d^4$, $d^5$ and $d$, and the corresponding cables $d^8$ and $f$ being the same.

In dumping one of the pans $b$ by means of the construction shown in Fig. 4, the crank shaft $e^6$ is first operated. This turns the shaft $e$, and the levers $d^5$ and $d^4$ are brought into operation and the corresponding pan $b$ is partially raised, after which the winding mechanism consisting of the shafts $g^2$, $g^3$ and $g^4$ and their connected gearing is brought into operation and the levers $d$ raise the pan $b$ into the position shown in dotted lines in said figure, and in this operation the rod $b^5$ of said pan moves outwardly until it engages the corresponding hooks $a^7$ at the sides of the body $a^3$ and the contents of the pan may then be dumped the same as with the construction shown in Figs. 1 and 3.

In the construction shown in Figs. 5, 5$^a$ and 6, there is a double winding mechanism the same as in Fig. 1, and the mechanism for raising the pan $b$ at the left of said figure is the same as in Fig. 1 except that the tracks $f^4$ on which the levers $d$ operate are carried higher at their outer ends as clearly shown in Fig. 5, and the rod $b^5$ which is secured transversely of the dumping chute of said pan moves in downwardly and outwardly inclined slots $h$ formed in the side walls of the body $a^3$.

When a low dumping point is required, the rod $b^5$ moves downwardly into the lower ends of said slots as clearly shown in dotted lines in Fig. 5, and the said rod may be held at the top of said slots as shown in full lines in said figure and in Fig. 5$^a$ by a catch or catches $h^2$ pivoted to the sides $a^4$ of the body $a^3$ and held in their raised position as shown in full lines in Fig. 5 and dotted lines in Fig. 5$^a$, by means of pins $h^3$ inserted into the side walls of the body $a^3$.

At the right of Fig. 5, which for the purpose of this description will be called the rear of the truck or vehicle, I have shown means for operating the pan or dumping the same both to the center of the vehicle and rearwardly thereof, and in this form of construction the said pan is provided both at its inner and outer ends with the wings $b^3$ and doors $b^4$ forming discharge chutes at both ends thereof. In this form of construction the pan $b$ is provided both at its front and rear edges or ends with a transverse rod $b^5$, and the bed $a^3$ is provided at its rear end with pivoted hooks $b^9$ adapted to engage the ends of said rods and which operate in connection with corresponding hooks formed on or connected with the body $a$ as clearly shown at the right of Fig. 5. In this form of construction the levers $d$ are also employed the same as in Fig. 1, and at the left of Fig. 5, or the front end of the vehicle shown in said figure, and in addition to the levers $d$, I also employ at each side of the pan supplemental lazy-tong levers $i$ which are of the double diamond style and which have a bottom connection at $i^2$ with the bed or frame $a$ of the truck and which are adapted to be connected with the pan at two different points $i^3$ and $i^4$, and for the purposes of this description the connections at $i^3$ and $i^4$ will be called the top connections of the lazy-tong levers, and the connection at $i^2$ the bottom connection, and the said lazy-tong levers or the members thereof are also provided with two forward pivotal connections $i^5$ and $i^6$ and with two rearward pivotal connections $i^7$ and $i^8$, and with a central pivotal connection $i^9$. In this form of construction there is a pulley $j$ at the top of the tracks $a^5$ over which the free end of the levers $d$ move, and the cables $f$ of the said levers are passed around these pulleys and connected with the shaft $e$ of the winding mechanism at the front end of the vehicle.

The pivotal connections of the lazy-tong levers $i$ at $i^2$, $i^6$ and $i^7$ are provided with grooved wheels or pulleys, and secured to the pivotal connection of said lazy-tong levers at $i^5$ is a cable $j$ which is passed around the pulley at $i^7$, then around the pulley at $i^6$, then around the pulley at $i^2$, and then connected with the shaft $e$.

The rod $b^5$ of the pan $b$ in the rear end of the vehicle, in this form of construction, also operates in slots $h$ in the side walls of the bed $a^3$ the same as the rod $b^5$ of the pan in the front end of the vehicle, and whenever it is desired to dump the rear pan $b$ to the rear of the truck or vehicle, with the parts in the position shown and the lazy-tong lever connection at $i^4$ in operation, the cables $f$ are disconnected from the lower ends of the levers $d$, and the crank shaft $e^6$ is turned to the right, and in this operation the rear pan $d$ is raised into the position indicated in dotted lines at $x$ and the contents thereof may be dumped at the rear end of the truck or vehicle as will be readily understood, after which the pan may be lowered into its normal position by reversing the operation of the crank shaft $e^6$.

Whenever it is desired to dump the rear pan at the middle of the truck or vehicle, the said pan must be thrown into the position indicated in dotted lines at $x^2$ and in this operation the cables $f$ are reconnected with the lower ends of the levers $d$ and the pivotal connection of the lazy-tong levers $i$ at $i^4$ is shifted to the point indicated at $i^3$. The hooks $b^9$ are then disengaged from the ends of the transverse rod $b^5$ at the rear end of the pan, and the shaft $e^6$ is turned to the right and the pan is thrown into the position indicated at $x^2$ by the levers $d$ and by the lazy-tong levers $i$ operating jointly.

The method of making the lazy-tong lever connection at $i^3$ and $i^4$ is clearly shown in Fig. 6, in which one side of the pan is indicated at $b$ and the connection at $i^4$ which is made by means of a pivot pin passing through the wall of the pan $b$ and through the lazy-tong members $i$, and this pin may be shifted to the point $i^3$ whenever desired.

In Fig. 6 the link members of the lazy-tong levers are shown double, but said members may be made either single or double as may be desired.

In the construction shown in Figs. 7 and 8 a bed or body $a^3$ is employed together with one set of winding gear or mechanism similar to those employed in Figs. 1 and 3, and consisting of shafts $e$, $e^3$ and $e^6$ and connected gear wheels. In this form of construction a single pan $b$ is employed which extends the full length of the bed $a^3$, and in this form of construction levers $m$ are employed which take the place of the levers $d$ shown in the forms of construction hereinbefore described and which are pivoted to the opposite sides and front end portions of the pan $b$ at $m^2$ and which extend backwardly approximately to the rear end portion of the body $a^3$ between the pan and the sides of said body, and which are provided with the rollers $d^3$ which travel on tracks or ways at the bottom of the bed, or on the side rails of the truck frame, and the levers $m$ are provided with cables $f$ as in Figs. 1, 3 and 5, said cables being connected with the shaft $e$. In this form of construction I also employ at the opposite sides of the pan a single diamond-shaped lazy-tong lever $m^3$ connected with the truck frame or bed at $m^4$ and with the top portion of the pan at $m^5$ and provided with lateral or forward and backward pivotal connections $m^6$ and $m^7$.

The ends of the parts of the toggle lever devices $m^3$ where they are connected at $m^6$ and $m^7$ are slotted as shown at $m^8$, and the pivot pins at $m^6$ and $m^7$ are passed through said slots, and this connection is therefore a sliding connection, and a cable $m^9$ is connected with the pivot pin at $m^7$ and passed around a grooved wheel or roller at $m^6$, and another grooved wheel or roller at $m^4$ and connected with the shaft $e$. The levers $m$ shown in this case are composed of two parts telescopically or adjustably connected as indicated at $m^{10}$. At the stern of the rear end of the body $a^3$ and in the opposite corners thereof are vertical keepers $n$ in which are placed vertically movable slides $n^2$ adapted to be adjusted into different positions vertically by means of pins $n^3$ and holes $n^4$ formed in said keepers and in said slides and through which said pins may be passed.

A bar $n^6$ is passed transversely across the rear end of the pan and through the rear ends of the vertically movable slides $n^2$, and the rear end of the pan $b$ is secured to this bar by means of keepers $n^7$, or in any other manner. With this form the height of the dump, or the height of the pan $b$ when the contents thereof is dumped may be regulated by means of the slides $n^2$, and in practice, if it is not desired to raise the discharge end of the pan above the position shown in full lines in Figs. 7 and 8, all that is necessary to dump the pan or the contents thereof is to operate the winding mechanism involving the shafts $e$, $e^3$ and $e^6$ by means of the crank $e^8$ connected with the shaft $e^6$. In this operation if said crank is turned to the right, the cables $f$ and $m^9$ will be wound on the shaft $e$ and the pan $b$ will be raised by the toggle lever devices $m^3$ and the levers $m$. The length of the levers $m$ is always fixed or adjusted to any desired point, but the connections of the toggle lever devices $m^3$ at $m^6$ and $m^7$ is a movable or slidable connection, and when the toggle lever devices $m^3$ have been raised as shown in Fig. 7, the pan $b$ may be raised still higher by means of the levers $m$ if the length of said levers has been previously adjusted to permit of such operation, and it will be understood that in the operation of raising the pan $b$, the slides $n^2$ will move upwardly until the desired point of discharge from the pan is reached, when the pins $n^3$ are employed to lock the slides $n^2$ in the desired position.

In the form of construction shown in Fig. 9, the bed or frame-work $a$ of the truck is provided rearwardly of the front truck with a transverse vertical V-shaped recess $o$ at the rear side of which the winding mechanism, consisting of the shafts $e$, $e^3$ and $e^6$ with their connected gearing and operating parts including the pawl $f^2$ and crank $e^8$ is placed.

In this form of construction the front part of the body $a^3$ is formed into a separate compartment $o^2$ having a backwardly and downwardly inclined bottom $o^3$ and a rear bottom door $o^4$ hinged at $o^5$ and adapted to open downwardly and backwardly so as to dump the contents of the compartment $o^2$ rearwardly of the front truck or axle. Placed in the rear portion of the body $a^3$ is a pan $b$ the rear end of which is inclined inwardly and downwardly, and the upper edge of the rear end portion is hinged or pivoted at $o^6$, and the body $a^3$ is provided at each side with the inclined tracks or ways $f^4$. In this form of construction double lazy-tong levers $i$ similar to those shown in Fig. 5 are employed at each side of the pan $b$, and these levers are pivoted to the bed or frame $a$ of the truck at $i^2$ and to the pan $b$ at $i^3$ and the parts thereof have a pivotal connection at $i^4$ and front pivotal connections at $i^5$ and $i^6$ and rear pivotal connections at $i^7$ and $i^8$ the same as in Fig. 5, and connected with the front pivotal connections at $i^5$ are cables $j$, and these cables are passed around rollers at their rear pivotal connections at $i^7$ and forwardly around rollers at the rear pivotal connections at $i^6$, and then downwardly and around rollers at the pivotal connections at $i^2$ from which point they are carried to and connected with the shaft $e$. In this form of construction the levers $d$ similar to those shown in Fig. 5 are also employed, and these levers are pivoted to the pan $b$ at $a^6$ as in Fig. 1, and the free ends thereof range downwardly and backwardly and are provided with rollers $d^3$ and cables $f$ are connected with the free ends of said levers and carried forwardly and secured to the shaft $e$, and in dumping the pan $b$, the lazy-tong levers $i$ and levers $d$ are both thrown into operation by turning the crank shaft $e^6$ and the pan $b$ is raised into the position shown in dotted lines and the contents thereof is dumped at the point $o^6$ as will be readily understood.

In the construction shown in Figs. 10 and 11, the pan $b$ is employed the same as in Fig. 9 and the rear end portion of this pan is inclined inwardly and downwardly as shown and is pivoted or hinged at $b^6$ the same as in Fig. 9. The pan $b$ in this form of construction, is divided into three compartments, the rear compartment $p$, the top front compartment $p^2$ and the bottom front compartment $p^3$. The bottom $p^4$ of the compartment $p^2$ is composed of two doors $p^5$ hinged at the opposite sides of said compartment as shown at $p^6$ in Fig. 11 and provided with a central support $p^7$, and said doors are adapted to open upwardly so as to permit of the filling of the bottom front compartment $p^3$. The rear end of the compartment $p^2$ is formed by a door $r$ hinged to the top of the pan at $r^2$ and adapted to open backwardly as indicated by the arrow $r^3$. At the rear end of the body $a^3$ is a compartment $r^4$ in the body $a^3$, and the bottom of the compartment $p$ in the pan $b$ is provided with a door $r^5$ hinged at $r^6$ and adapted to open downwardly in the direction of the arrow $r^7$. A door $r^8$ is also hinged at $r^9$ so as to separate the compartments $p$ and $p^3$, and this door is adapted to open in the direction of the arrow $s$, and the rear end portion of the body $a^3$ is provided with a door $s^2$ which is hinged at $s^3$ and adapted to open in the direction of the arrow $s^4$, and the rear end portion of the compartment $p^3$ in the pan $b$ is provided with a door $s^5$ hinged at $s^6$ and adapted to open in the direction of the arrow $s^7$. In this form of construction the lazy-tong levers $i$ and the levers $d$ are employed the same as in Fig. 10, and the winding mechanism consisting of the shafts $e$, $e^3$ and $e^6$ are placed beneath the body of the vehicle and mounted in or on the truck frame or bed $a$ and the pan $b$ may be raised at any time into the position shown in dotted lines in Fig. 10 by turning the shaft $e^6$ by means of the crank $e^8$.

In raising the pan $b$ into the position shown in dotted lines, the doors $r^5$ and $s^5$ may remain closed while the doors $r$ and $r^8$ may be left free to swing and all the contents of the pan or the separate compartments thereof will be dumped as will be readily understood.

The contents of the compartment $p^3$ may be dumped into the compartment $r^4$ in the body $a^3$ and shoveled out through the door $s^2$ when desired and the contents of the compartment $p^2$ may also be dumped through the door $r$ and the door $r^5$ into the compartment $r^4$ if desired, the doors $r$ and $r^5$ opening for this purpose and the contents of the compartment $p^3$ in the pan $b$ may also be dumped into the compartment $r^4$, the door $s^5$ opening for this purpose, the bottom of the pan $b$ in this form of construction is provided with brackets $t$ in which the telescopic chute $f^3$ is placed, and this chute may be used in the usual manner for conveying the coal from the pan $b$ when in its raised position to a scuttle hole or other receiver in a pavement or other locality.

With all the forms of construction shown, it will be seen, that a pan or pans carried in the bed or body of a truck or other vehicle constitutes the distinctive feature of the construction shown and described herein together with mechanism for elevating said pan or pans and dumping the same at one or both ends of the body or at the middle thereof, and in Fig. 9 of the accompanying drawings the bed or body has a separate compartment in which no pan is placed, but this is not an essential feature in my invention and may or may not be employed.

Having fully described my invention, what I claim as new and desire to secure by Letters Patent, is:—

1. In a dumping truck or vehicle, a body or frame, a pan or receiver placed in said body or frame and adapted to receive material to be conveyed from one point to another, and means for raising said pan or receiver bodily into an elevated position and dumping it from a point at or above the top of said body or frame.

2. In a dumping truck or vehicle, a body or frame, a pan or receiver placed in said body or frame and adapted to receive material to be conveyed from one point to another, and means for raising said pan or receiver bodily into an elevated position and dumping it from a point at or above the top of said body or frame and in line with the longitudinal center of the truck or vehicle.

3. In a dumping truck or vehicle, a body in which is placed a pan adapted to receive material to be conveyed from one point to another, and means for raising said pan into an elevated position and dumping the contents thereof either at one end of the body or through the middle thereof, consisting of levers pivoted to the pan at the opposite sides thereof and the free ends of which travel on tracks or ways at the sides of the body, and a cable connected with the free ends of said levers and with winding mechanism connected with the body.

4. In a dumping truck or vehicle, a body in which is placed a pan adapted to receive material to be conveyed from one point to another, and means for raising said pan into an elevated position and dumping the contents thereof either at one end of the body or through the middle thereof, consisting of levers pivoted to the pan at the opposite sides thereof and the free ends of which travel on tracks or ways at the sides of the body, and a cable connected with the free ends of said levers and with winding mechanism connected with the body, and lazy-tong levers also connected with the pan and with the body, and operating cables connected therewith and with the winding mechanism.

5. In a dumping truck or vehicle, a body or frame, a pan or receiver placed in said body or frame and adapted to receive material to be conveyed from one point to another, and means for raising said pan or receiver bodily and for dumping it at the rear end of the truck or vehicle from a point at or above the top of the body of the frame, the rear end of the body or frame and the rear end of the pan or receiver being provided with vertically arranged and vertically adjustable connections on which the rear end of the pan or receiver is adapted to turn.

In testimony that I claim the foregoing as my invention I have signed my name in presence of the subscribing witnesses this 20th day of April 1909.

WILLIAM H. HUNT.

Witnesses:
C. E. MULREANY,
H. R. CANFIELD.